United States Patent  [15] 3,696,848
Mellon et al. [45] Oct. 10, 1972

[54] METHOD AND APPARATUS FOR REMOVING SKIN FROM ONIONS OR LIKE VEGETABLES

[72] Inventors: Eugene P. Mellon, Alexandria, Va.; Lester A. Kisner, Clarksburg, Md.

[73] Assignee: Marriott Corporation, Montgomery County, Md.

[22] Filed: July 22, 1970

[21] Appl. No.: 57,224

[52] U.S. Cl. .................................................146/83
[51] Int. Cl. ...........................................A23m 15/04
[58] Field of Search......146/43 R, 83, 227, 230, 241, 146/51, 73

[56] References Cited

UNITED STATES PATENTS

| 3,485,279 | 12/1969 | Parsons | 146/230 |
| 2,788,819 | 4/1957 | Guatelli et al. | 146/73 X |
| 1,992,995 | 3/1935 | Denner et al. | 146/43 R |
| 2,361,241 | 10/1944 | Rogers | 146/37 X |
| 2,766,794 | 10/1956 | Odale | 146/43 X |

FOREIGN PATENTS OR APPLICATIONS

| 821,315 | 10/1959 | Great Britain | 146/83 |

Primary Examiner—Willie G. Abercrombie
Attorney—Beveridge & De Grandi

[57] ABSTRACT

An onion skin is cut into two truncated hemispherical segments and a stream of fluid is directed under the skin to remove it from the onion.

The onion is prepared for the skin-removal operation by cutting off its crown and root ends and making longitudinal cuts in the skin on a first conveyor, transferring the onion to a second conveyor where it is rotated about its polar axis while first being given an equatorial cut and then being subjected to fluid streams directed through the cuts and under the onion skin. The onion-engaging means on the second conveyor are spaced apart a distance equal to the distance between the end cutting blades on the first conveyor.

5 Claims, 16 Drawing Figures

FIG 1A

INVENTORS
EUGENE P. MELLON
LESTER A. KISNER

BY Beveridge &
De Grandi

ATTORNEYS

METHOD AND APPARATUS FOR REMOVING SKIN FROM ONIONS OR LIKE VEGETABLES

This invention relates to a method and apparatus primarily intended for removing the skins from onions, although the invention may also be used for removing the skin from like vegetables which have a thin dry outer skin which is affixed to the underlying layers primarily at the crown and root ends of the vegetable.

The prior art, as represented by the patent literature, includes many devices for performing cutting operations on onions by severing the crown and root ends therefrom or removing a core from the vegetable. In some instances typified by U.S. Pat. Nos. 2,445,881, 2,602,480, 2,766,794 and 3,126,930, onion skins are removed under the influence of a stream of fluid such as gas or liquid. Prior to our invention, onion skins have been cut longitudinally by means of a cutting blade lying in the path of onions on a conveyor, prior to subjecting the onion to a skin-removing fluid stream.

These prior efforts have met with limited success which may be attributable to difficulties in designing suitable onion-carrying conveyors and in obtaining total removal of the onion skins in order to avoid further inspection and hand-processing.

According to one aspect of the invention, an onion processing apparatus is provided with two associated conveyors, both of which carry onions in a path which is perpendicular to their polar axes. On the first conveyor, the onion is cut by blades which remove its crown and root ends. In a transfer section, the cut ends of the onion are contacted by onion-engaging means on the second conveyor which move together to engage the onion and remove it from the first conveyor. A significant feature of this aspect of the machine is that the onion-engaging means on the second conveyor are spaced apart a distance approximately equal to the distance between the constantly spaced end cutting blades on the first conveyor in order to assure proper engagement of the onion on the second conveyor.

A more significant aspect of the invention resides in the manner in which the onion skin is cut prior to being removed by a stream of fluid. This involves cutting the onion skin into two truncated hemispherical bodies, preferably by removing the crown and root ends from the conveyor and making an equatorial cut in the vegetable. Preferably but not essentially, the skin is also provided with a longitudinal cut to facilitate the removal of its skin. These operations are performed at normal ambient atmospheric temperatures and pressures, and there is no skin-loosening pretreatment to the onion prior to entering the apparatus.

Still another feature of the disclosed apparatus involves a particular manner in which a nozzle for removing the vegetable skin is related to the vegetable-carrying conveyor so that the nozzle is located in the path of moving vegetables and is supported by support means which are movable under the influence of advancing vegetables in order to gauge the distance between the nozzle and the vegetables. Another feature involves the apparatus for making an equatorial cut by rotating the vegetable about its polar axis and advancing it into engagement with a cutting blade in order to make the equatorial cut.

Various other features, many of which may be employed in diverse types of vegetable-processing operations, will be appreciated from a study of the following description and the accompanying drawings wherein:

FIG. 14 is an exploded view of the adjustable coupling used in the drive train of FIG. 12.

GENERAL DESCRIPTION OF THE MACHINE

Briefly, the preferred embodiment of a machine incorporating the claimed inventive features comprises a first conveyor which supports and holds the onion while moving it along a path which lies perpendicular to its horizontal root-stem or polar axis. While on the first conveyor, the stem and root portions of the onion are cut off in a fashion so that the remaining body of all onions will have a constant polar or axial dimension regardless of their initial shape and size. Then, a pair of longitudinal cuts are made in the onion skin by cutting blades which lie initially in the path of the moving onion and move outwardly from the path of the onion in order to progressively to make the longitudinal cut or cuts.

Next, the onion enters a transfer section where it is engaged by a second conveyor and removed from the first conveyor. The second conveyor includes gripping means which engage the cut surfaces at the opposite polar ends of the onion. While being held by the gripping means, the onion is positively rotated about its polar axis and is brought into engagement with a cutting blade which makes an equatorial cut in the onion skin. Then, the onion is advanced while continuing its rotation, into an assembly which directs jets of fluid against the longitudinal and equatorial cuts, to remove the skin from the onion. A stream of cleansing fluid such as water then is directed on the onion and the onion is discharged from the machine for further processing.

Throughout this specification, the apparatus and the products passing through the apparatus have been defined by using nomenclature which is customarily used in defining the earth, so that the root-stem axis of the onion is referred to as the polar axis, arcuate cuts along the surface of the onion from the root to the stem are called longitudinal cuts, and a circumferential cut in the vicinity of the center of the onion is considered an equatorial cut.

THE FIRST CONVEYOR

Figure 1A:
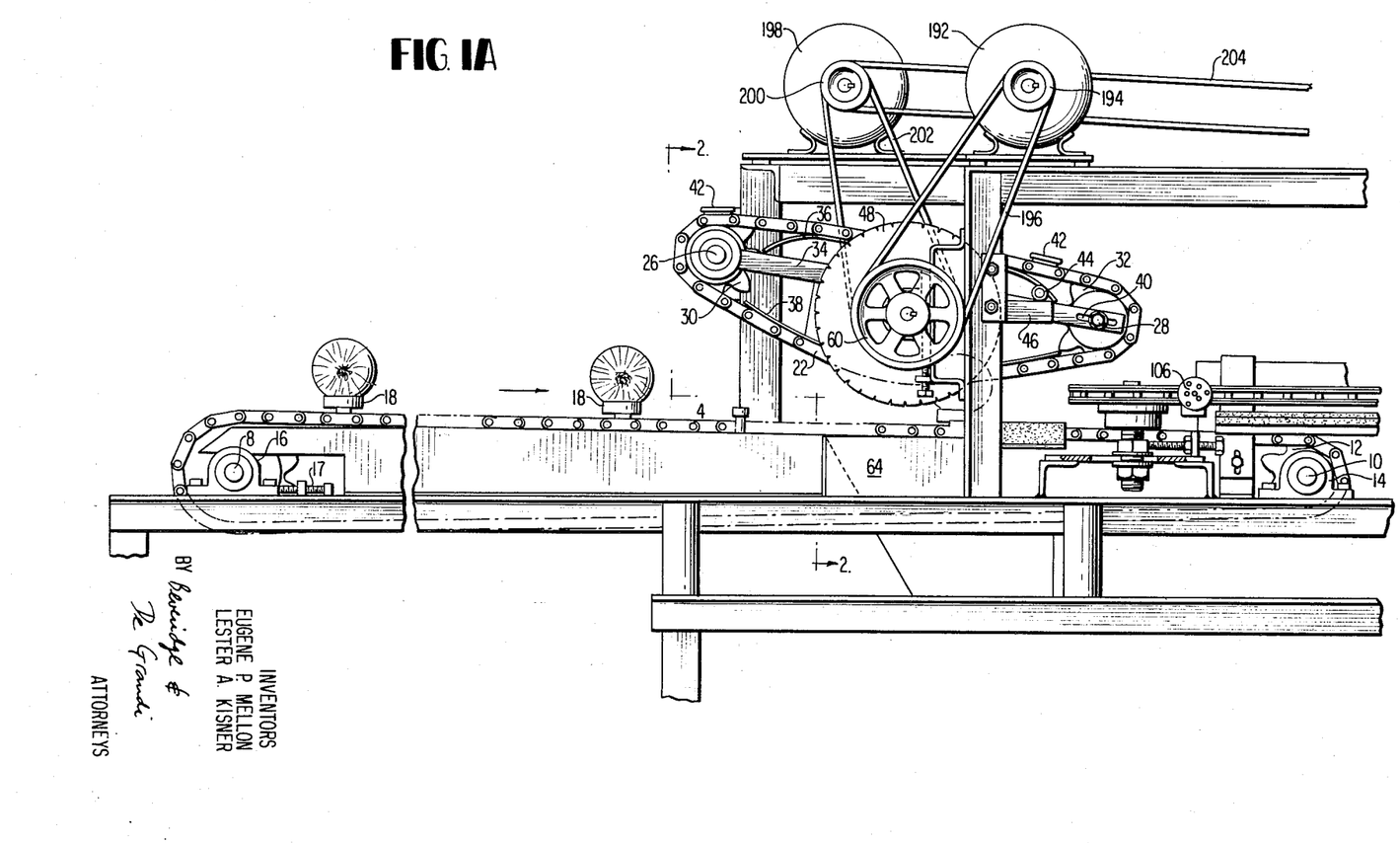
FIG. 1A is a side elevation of the first conveyor where the onions are cut to remove their crown and root ends and the onion skin is cut longitudinally.

As previously mentioned, the first conveyor of the preferred form of the apparatus is used to hold and move the onion in a path which lies perpendicular to the polar axis of the onion. As seen in FIGS. 1A, 2, 3 and 5, this conveyor 2 includes a lower section formed of a pair of continuous chains 4 and 6 which rotate on sprockets carried by the shafts 8 and 10. Two such sprockets are shown at 12 and 13 in FIGS. 1A, 3 and 4. The shaft 10 is rotatably mounted in bearing assemblies 14 shown in FIG. 1A and is positively driven in a manner described later in the specification. The shaft 8 which carries the idler sprockets is rotatably mounted in bearing assemblies 16, one of which is shown in FIG. 1A. The tension on the chains 4 and 6 is controlled by adjusting the position of the bearing assemblies 16 by means of a threaded adjustment bolt 17 which displaces the bearing assembly 16 outwardly.

Figure 2:
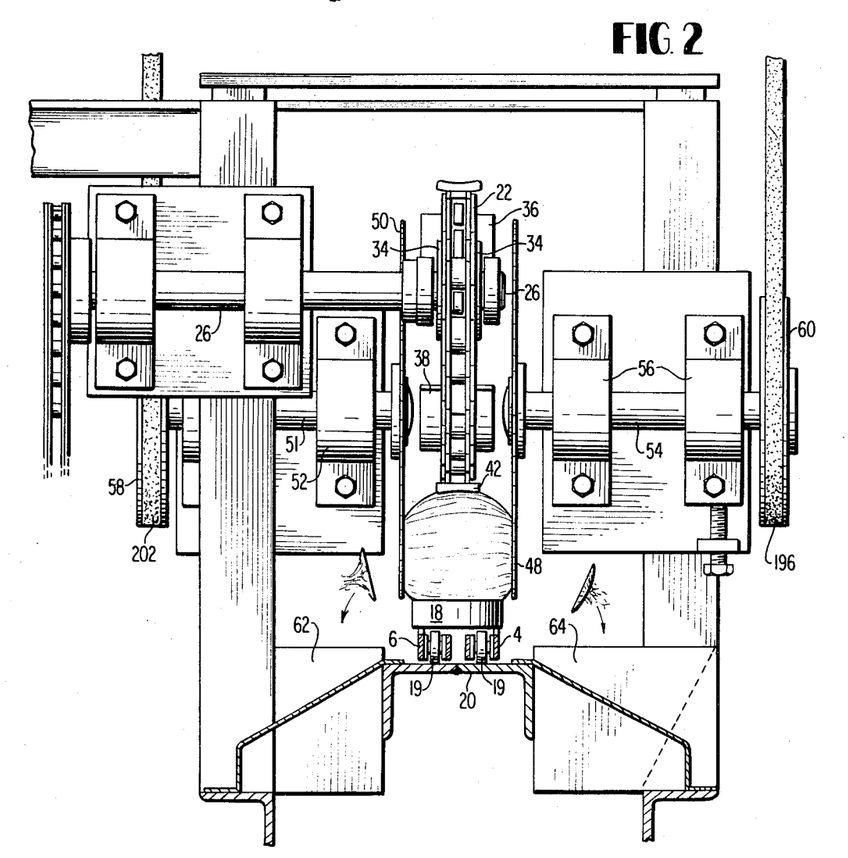
FIG. 2 is an elevational view of the first conveyor as seen along the lines 2—2 in FIG. 1A.

Onions are carried on the first conveyor by shallow cylindrical cups 18 which have interiorly chamfered upper ends and are connected to both of the chains 4 and 6 as will be seen in FIG. 2. When the chains are moving on the upper and onion-carrying run, rollers 19 of the chain ride on the channel member 20 so that the cups 18 will maintain a suitable elevation with respect to the mechanisms which operate on an onion.

Figure 3:
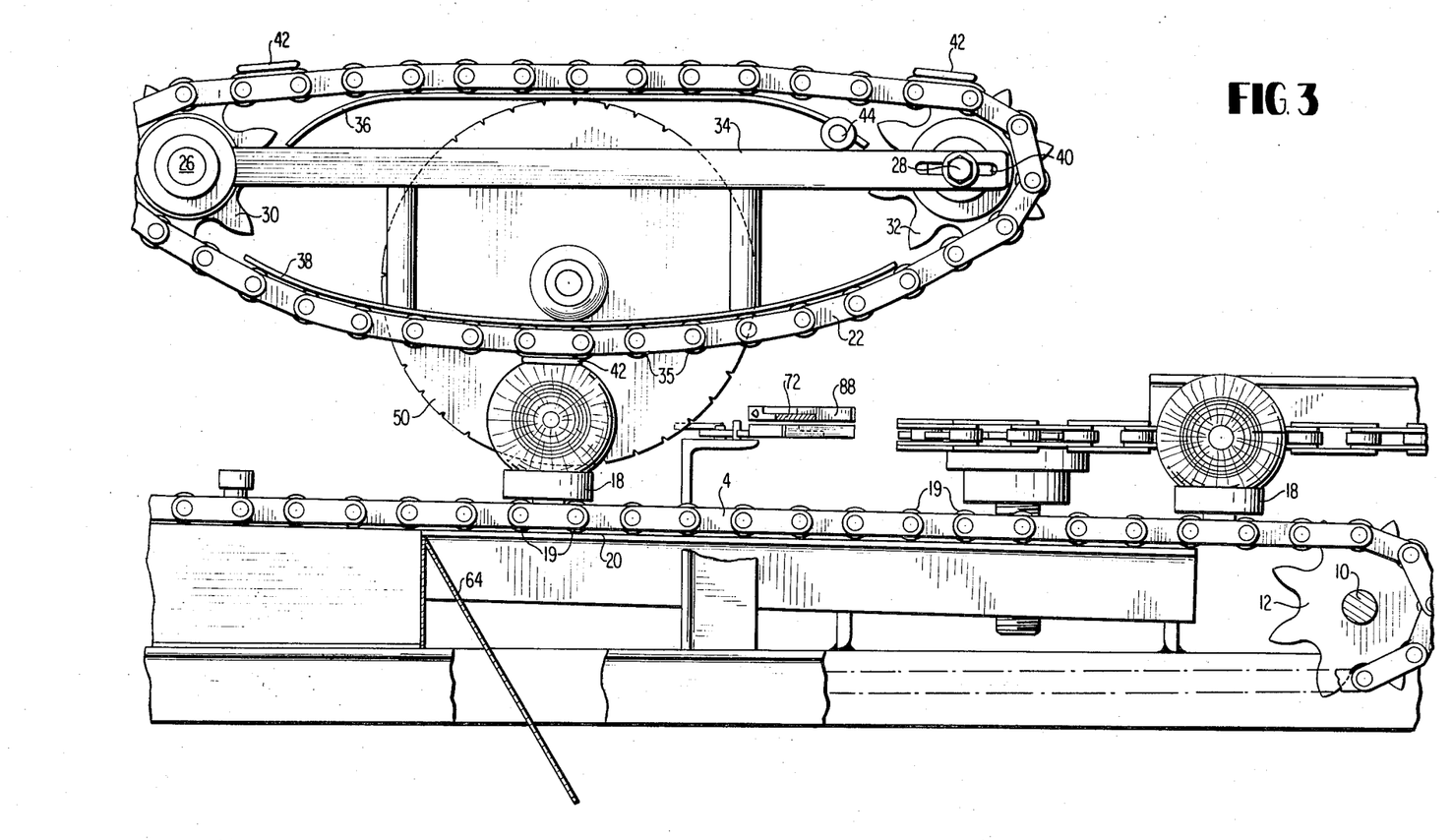
FIG. 3 is an enlarged elevational view of the first conveyor showing the longitudinal cutting mechanism and the transfer area where vegetables are engaged by the second conveyor.

When mechanical operations are performed on an onion, it is desirable to hold the onion firmly on the conveyor. Preferably, this is accomplished by providing an upper section of the first conveyor which serves as a holddown device. This is best seen in FIGS. 2 and 3. The holddown section has a chain 22 which is carried by shafts 26 and 28 and their associated sprockets 30 and 32. Shaft 26 is rotatably held by a pair of stationary bearing assemblies 27 and 29 to pivotally support the frame of the holddown section. The frame of the holddown section includes a pair of spaced apart main frame members such as the one designated 34 in FIGS. 1A and 3. The general contour of the chain is maintained by virtue of chain rollers 35 riding on interior guide plates 36 and 38 which are supported by the main frame members 34. Chain tension may be adjusted by changing the location of the shaft 28 in the elongated slots 40 of members 34.

The onion-engaging portions of the holddown section are the pressure pads 42 which are spaced apart on the chain 22 a distance equal to the spacing between the cups 18 on the chains 4 and 6. The linear velocity of the respective chains 4, 6 and 22 are equal and the relative locations of the cups 18 and pressure pads 42 are such that a pressure pad will always be aligned with a cup 18 when cutting operations are performed.

The downward force applied by the holddown section to an onion by the pressure pads 42 is governed in part by the weight of the holddown section which is, as previously stated, pivotally supported by the shaft 26. When the apparatus is inoperative or the holddown conveyor is not in contact with an onion, its lowermost position is limited by means of a stop element 44 which engages an abutment member 46 on the machine frame. As an onion in one of the cups 18 approaches the holddown section of the first conveyor, there will be initial contact by one of the pressure pads 42 with the upper surface of the onion, and further advancement of the onion will raise the frame of the holddown conveyor about the axis of the shaft 26 so that the weight of the holddown conveyor serves to hold the onion in position for onion cutting operations.

END CUTTING SECTION

The first cutting operation performed on an onion is the removal of the crown and root ends as the onion is advancing with its polar axis oriented transversely to its direction of movement. As best seen in FIGS. 2 and 3, the onion is advanced into cutting engagement with a pair of positively rotated cutting discs 48 and 50 provided with serrated sharpened peripheral edges which simultaneously remove the crown and root ends of the onion. Undesired displacement of the onion under the influence of the cutting discs 48 and 50 is prevented by the positive holding of the onion in the cups 18 by the pressure pads 42 of the holddown section.

The cutting disc 50 is coaxially supported on a shaft 51 which is rotatively mounted on the machine frame in pairs of bearing assemblies, one of which is designated 52 in FIG. 2. The other cutting disc 48 is carried by a shaft 54 which is supported in a pair of bearing assemblies 56 mounted on the frame. The shafts 51 and 54 respectively carry pulleys 58 and 60 which are positively driven in a manner described later in this specification.

When an onion passes through the first cutting station where the discs 48 and 50 are located, the crown and root ends are cut from the onion and fall into respective chutes 62 and 64 which lead to a disposal mechanism such as a garbage grinder.

LONGITUDINAL CUTTING ASSEMBLY

Figures 5, 6:
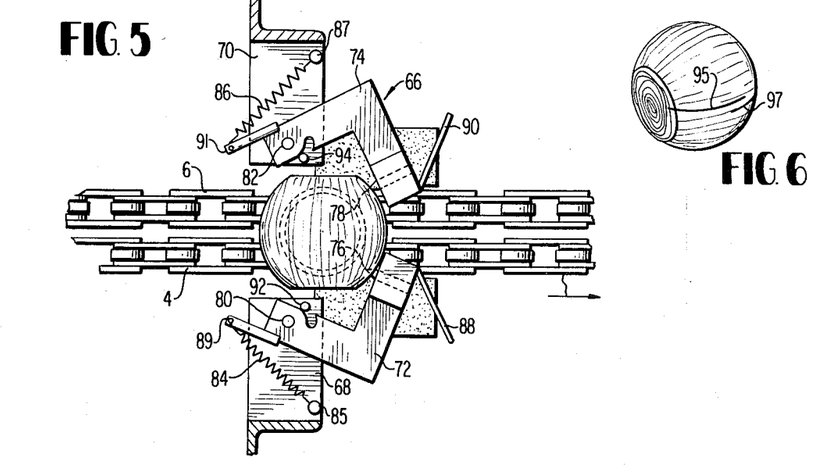
FIG. 5 is a plan view showing the position of the longitudinal cutting mechanism during a skin cutting operation.
FIG. 6 illustrates the condition of an onion as it is discharged from the first conveyor.

The longitudinal cutting assembly generally designated 66 is used to make shallow arcuate longitudinal cuts in the onion skin to promote easy removal of the skin from the onion. This assembly includes a pair of cutting members which are mounted for movement about pivotal axes which lie on opposite sides of the path of the onion. As best seen in FIG. 5, this cutting assembly 66 includes a pair of stationary platform members 68 and 70 located on opposite sides of the onion path. A pair of pivoted blade-carriers 72 and 74 carry the cutting blades 76 and 78 and are mounted on the stationary pivot members 80 and 82. Tension springs 84 and 86 have their opposite ends connected to pins 85 and 87 on the respective platform members 68 and 70 and to extensions 89 and 91 which are connected to the blade-carriers 72 and 74. Each of the blade-carriers 72 and 74 has an attached onion engaging element 88 and 90 which rides down the trailing portion of an onion after the longitudinal cuts have been made. This prevents the impact which otherwise would occur as the blade-carriers 72 and 74 strike the abutment pins 92 and 94 at the conclusion of a cutting step.

Figure 4:
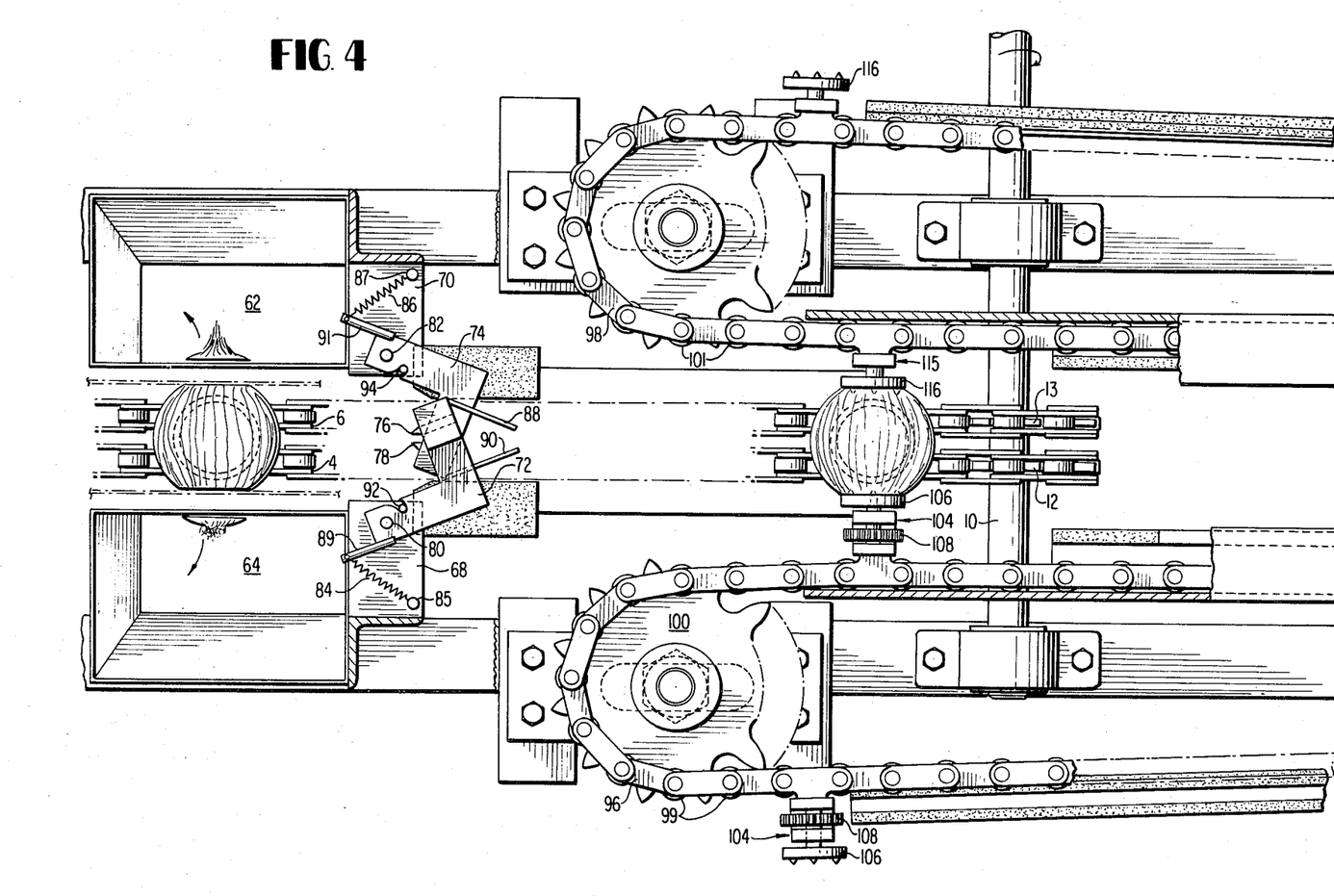
FIG. 4 is a plan view of that portion of the apparatus illustrated in FIG. 3.

Geometrical considerations make it difficult for both of the cutting blades 76 and 78 to start at a common point on the onion, so it is convenient to displace them slightly in order to make a pair of generally parallel but spaced apart cuts shown at 95 and 97 in FIG. 6. When this is done, the normal rest position of the blade-holding elements 72 and 74 is as shown in FIG. 4 with one element lying above the other.

After the longitudinal cuts have been made, the first onion is transferred to the second conveyor of the machine where subsequent operations are performed.

THE SECOND CONVEYOR

The second conveyor is designed to advance the onion in a direction perpendicular to its polar axis and rotate the onion about its polar axis during such movement. As seen in FIG. 4, the second conveyor includes a pair of spaced apart endless chains 96 and 98 which are provided with rollers 99 and 101 on their link-connecting pins. Both chains are oriented in a plane which is substantially coincident with the polar axis of an onion carried thereby. The chain 96 has one end supported on an idler sprocket 100 and its other end supported on a driven sprocket, the hub of which is shown at 102 in FIG. 1B. A more complete description of the chain supporting and driving means is given below in connection with FIG. 13. At equally spaced points along the chain 96, there are gripping assemblies 104 which rotatively carry onion-engaging members 106. Each onion-engaging member 106 has a plurality of small projections which promote its engagement with an onion, and it is supported on a shaft rotatively mounted on the main body of the gripping assembly 104. The shaft which supports the onion engaging member 106 also has a pinion gear 108 keyed thereto so that the onion engaging member 106 may be positively rotated in a manner described later.

Figure 7:
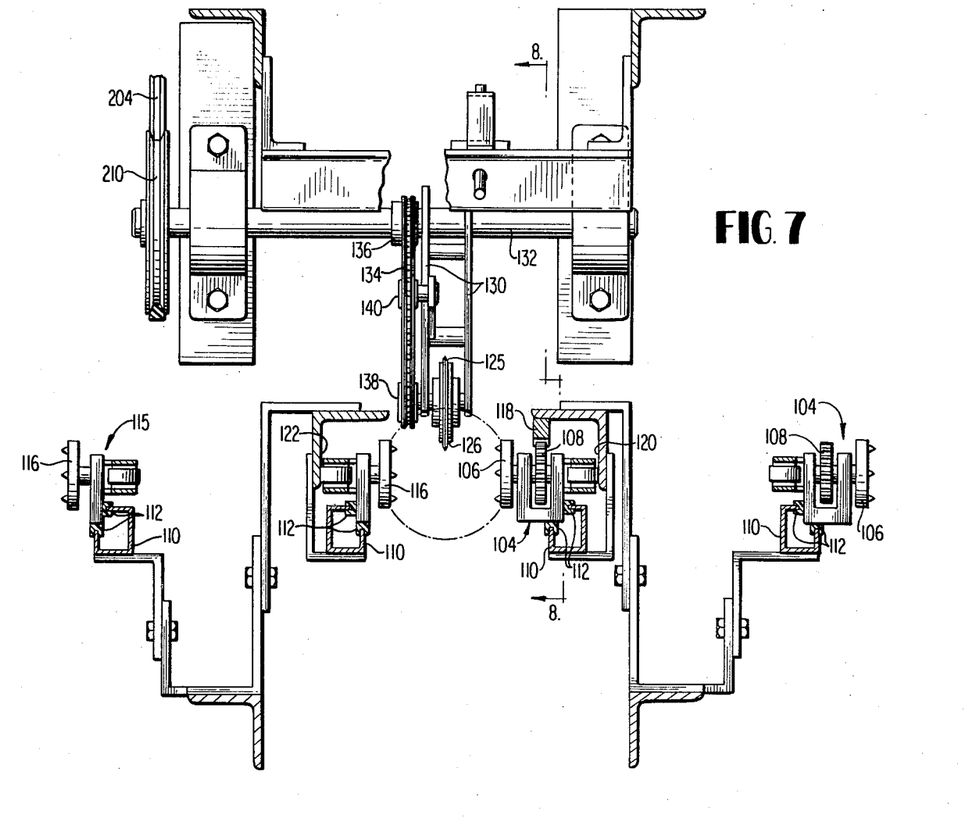
FIG. 7 is a view of the second conveyor and the equatorial cutting mechanism, partially in section, as seen when looking in the direction of conveyor movement.

The gripping assembly 104 is guided to some extent throughout most of its movement by supplemental guide tracks which are best seen in FIG. 7. These guide tracks include channel elements 110 which carry low friction plastic inserts 112 for engaging the horizontal and vertical surfaces of the main body of the gripping assembly, in order to prevent sagging of the chain and undesired displacement of the gripping members.

The gripping assemblies 115 on second chain 98 are similar to the gripping assemblies 104 except that they lack the pinion gear 108. A plurality of gripping assemblies 115 are spaced apart a same distance as the gripping assemblies 104 and their movement is coordinated so an onion will simultaneously be engaged and gripped by the onion engaging members 106 and 116. The movement of the gripping assemblies 104 and 115 is coordinated with the movement of the cups 18 on the first conveyor so that an onion, after being longitudinally cut by the longitudinal cutting assembly 66 will enter a transfer section where the onion is no longer engaged by one of the pressure pads 42 on the holddown section of the first conveyor. In this transfer section, the members 106 and 116 on the second conveyor move in converging paths until they engage the cut ends of the onion and are spaced apart a distance approximately equal to the distance between the end cutting discs 48 and 50. An onion gripped between the members 106 and 116 is then carried away by the second conveyor as the cup 18 on the first conveyor moves downwardly around its supporting sprocket 12. As seen in FIG. 7, the rollers 99 and 101 in the chains 96 and 98 ride on vertical surfaces 120 and 122 during all operations on the onion so that there will be a constant distance between the members 106 and 116. This distance is approximately equal to the distance between cuts made by the end-cutting discs 48 and 50.

Figures 8, 9, 10:
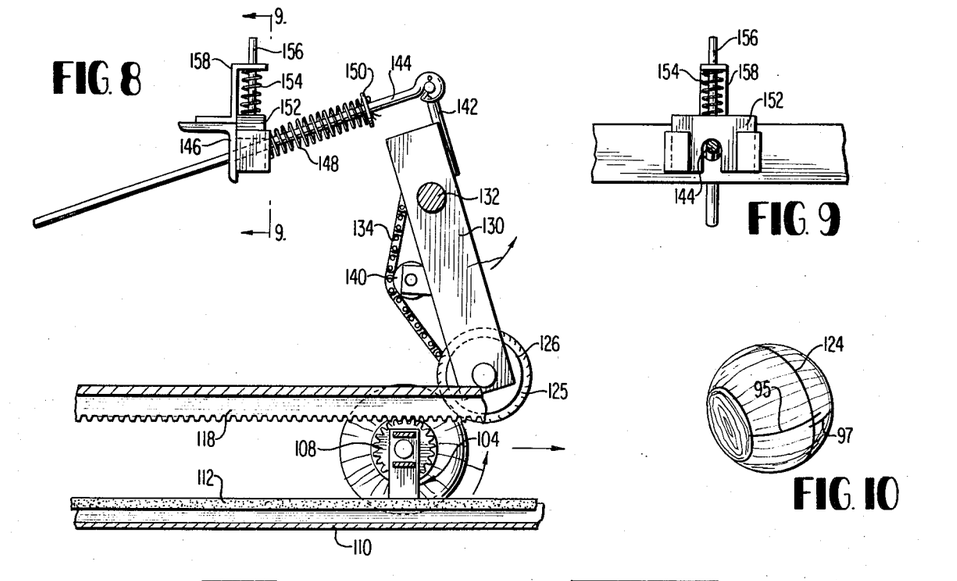
FIG. 8 is a view of the equatorial cutting mechanism as seen along the line 8—8 in FIG. 7.
FIG. 9 shows the frictional drag assembly associated with the longitudinal cutting mechanism, as seen along the line 9—9 in FIG. 8.
FIG. 10 illustrates the condition of an onion after it leaves the equatorial cutting mechanism.

The second conveyor includes means for rotating the onion about its polar axis during the phases of machine operation where the onion skin is equatorially cut and removed by a fluid stream. Such rotational movement may be imparted by engaging the pinion gear 108 with the teeth of a stationary rack 118 which faces downwardly as shown in FIG. 8. Of course, as the gripping assembly 104 advances in the machine direction, engagement of the pinion 108 with the rack 118 will cause rotation of the onion which is held between the onion engaging members 106 and 116.

EQUATORIAL CUTTING ASSEMBLY

When the onion is moving along the second conveyor and is being positively rotated, it is brought into engagement with the cutting assembly shown in FIGS. 7 and 8 which serves to make the equatorial cut designated 124 in FIG. 10 of the drawings. This cutting assembly includes a positively rotated circular cutting disc 125 which has a sharpened peripheral edge. The depth of a cut made thereby is limited by the presence of a shoulder 126 which will engage the outer surface of the onion in the vicinity of the cut.

The blade 126 is carried by a shaft rotatably mounted on a pair of swinging arms 130 which are pivotally mounted about a shaft 132, the central axis of which is fixed with respect to the machine frame. A chain 134 is driven by a sprocket on the shaft 132 and, in turn, drives a sprocket 138 which is keyed to the shaft of the cutting blade 125. The appropriate tension in the chain 134 may be maintained by an idler wheel 140.

The apparatus is constructed so the blade 126 lies in the path on an onion which is advancing and rotating on the second conveyor. Engagement of an onion with the blade 126 will, of course, result in the equatorial cutting step and displacement of the arms 130 in a counter-clockwise direction as viewed in FIG. 8.

Since proper operation of the cutting blade 126 requires that some pressure be applied against the onion, the arms 130 carry an upward extension 142 which pivotally receives an eye on the end of a rod 144. The rod passes through an opening in a stationary frame element 146, and a compression spring 148 acts between the frame element 146 and a washer 150 keyed to the rod 144 in order to apply a clockwise torque on the arm 130.

Experience has shown that some frictional resistance to movement of the arm 130 is also desirable. This is provided by means of a vertically recriprocable member 152 which is slotted so that its undersurface is in frictional engagement with the rod 144. A compression spring 154 surrounds an upstanding rod 156 which is guidingly supported by a bracket 158 attached to the frame. This arrangement tends to dampen the movements of the blade-supporting arms 130 and promote efficient operation of the apparatus.

SKIN REMOVAL ASSEMBLY

Figure 1B:
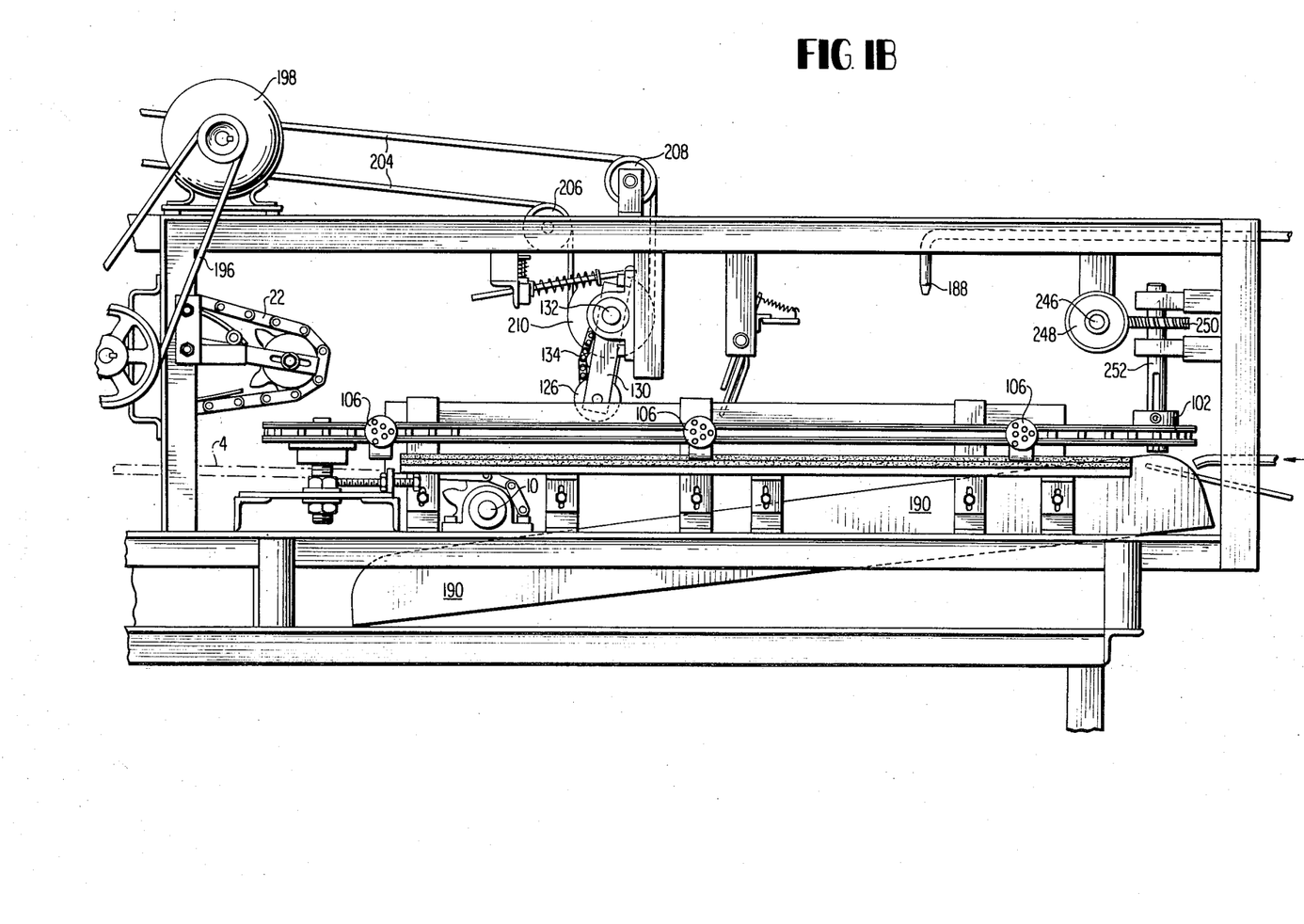
FIG. 1B overlaps FIG. 1A in part and shows the second conveyor where the onion skins are cut equatorially and the skins are removed from the vegetable.
Figures 4, 11, 12:
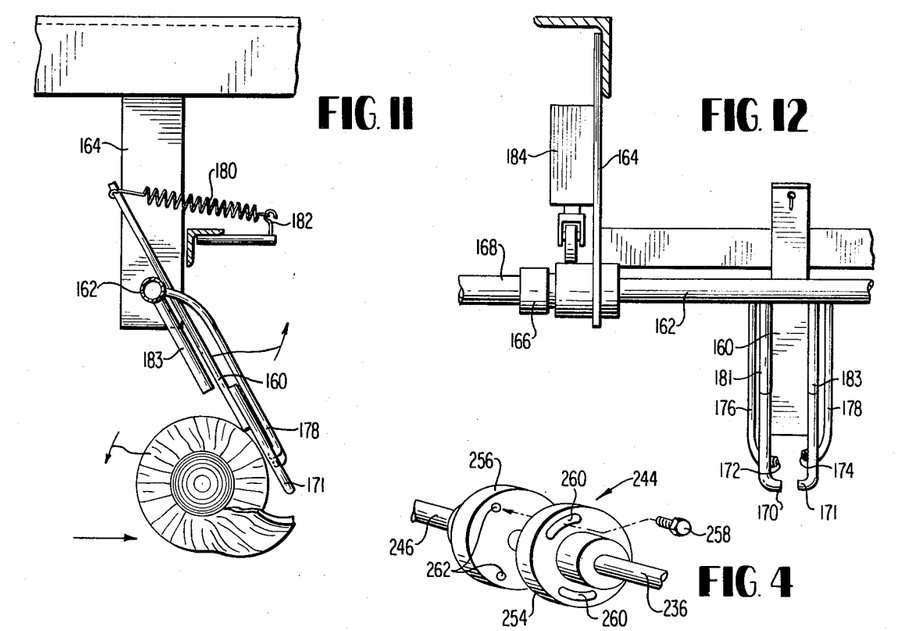
FIG. 11 is a side elevation, partially in section, of the skin removal section including the swingable fluid jets which are located in the path of an advancing onion.
FIG. 12 is an elevational view of the assembly seen in FIG. 11 as viewed in the direction of conveyor travel.

After the onion skin has been provided with equatorial and longitudinal cuts, the skin may be removed by rotating the onion while directing a fluid stream thereagainst. The skin removal assembly in the preferred version of the apparatus is illustrated best in FIGS. 11 and 12. The skin removal assembly preferably includes jet nozzles, two of which initially lie on the path of an advancing onion and are displaced from the path when engaged by the onion. The rest position of the assembly is illustrated in FIG. 1B where it is inclined slightly toward the forthcoming onions. This assembly includes a plate 160 secured to a supporting conduit 162 which is rotatably mounted on stationary frame elements 164. A rotary coupling 166 connects the conduit 162 to a fluid supply line 168.

Tubular supports 176 and 178 connect the jet nozzles 172 and 174 to the supporting conduit 162. The nozzles 172 and 174 are oppositely directed and are oriented and spaced with respect to the onion engaging elements 170 so the emerging jet of fluid will strike the onion in the vicinity of the equatorial cut 124. The fluid stream passes through the equatorial cut and under the skin, thereby removing the truncated hemispherical portion of the skin which lies between the end cut created by the discs 48 and 50 and the equatorial cut created by the blade 126.

A second set of jet nozzles 181 and 183 are carried by the supporting conduit 162 where they will strike the longitudinal cuts 95 and 97 in the onion skin. The fluid streams emerging from the nozzles 181 and 183 are oriented principally in planes which are spaced from the equatorial plane and lie perpendicular to the polar axis of the onion, so that the fluid will enter beneath the onion skin at the longitudinal cuts and urge the skin outwardly in a direction which is radial with respect to the onion's polar axis. The onion is rotated so that the portion of its outer surface struck by the streams from nozzles 181 and 183 is moving in an opposite direction from the impinging streams from nozzles 181 and 183.

Proper spacing and orientation of the jet nozzles with respect to the onion is ensured by a pair of onion-engaging elements 170 and 171 which are on the plate 160 and initially lie in the path of an advancing onion. Engagement of the members 170 and 171 with the onion is assured due to the use of a tension spring 180 which acts between the upper end of the member 160 and an eye 182 on the machine frame. Movement of the onion against the elements 170 and 171 will produce counter-clockwise movement of the nozzles as viewed in FIG. 11. After the onion has passed, the elements of the skin removal assembly will return under the influence of spring 180 to the rest position shown in FIG. 1B.

Since it is not necessary for air to be discharged from the nozzles 172, 174, 181 and 183 unless an onion is in contact with the device, it is desirable to provide valve means which furnishes air to the nozzles only when the support member 160 is displaced by an onion. This may be done, for example, by a microswitch 184 which is actuated upon rotation of the conduit 162. Closing of the microswitch actuates a solenoid valve which furnishes air to the conduit 168. Alternatively, the microswitch may be replaced by a valve assembly which is mechanically actuated by displacement of the skin removing assembly to introduce air to the conduits leading to nozzles 172 and 174.

WASHING SECTION

After leaving the skin removing section, the onions are advanced by the second conveyor through a washing station where a downwardly directed spray of water is emitted by a nozzle 188. In addition to cleansing the onion, the spray of water serves to remove any loose pieces of skin from the onion. The spray carries such residue into a tray 190 which extends below the apparatus for substantially the length of the second conveyor. This tray 190 is inclined and it extends below the skin removing section and the equatorial cutting section so that any matter removed from the onion at these previous stations will also fall into the tray 190. The flow of water through the tray carries this residue downwardly to a collection area where it meets the residue produced during the cutting operations on the first conveyor. A garbage grinder mascerates or comminutes these waste materials and discharges them into a sewage system.

DRIVE MECHANISMS

The preferred form of the apparatus uses two motors for driving the rotary cutting blades 48 and 50 for the end cutting section and the cutting blade 126 in the equatorial cutting section. As seen in FIG. 1A the shaft of motor 192 carries a pulley 194. A drive belt 196 connects the drive pulley 194 to a driven pulley 60 which, as previously described, is keyed to the shaft 54 of the cutting disc 48.

The other end cutting disc 50 and the equatorial cutting blade 126 are driven by a motor 198 which has a shaft carrying a double grooved pulley 200. One groove in the pulley 200 receives the drive belt 202 which engages the pulley 58 of the shaft 51 in order to drive the cutting disc 50.

The second grove on the pulley 200 receives an elongated drive belt 204 which drives the equatorial cutting blade 126 through the drive train illustrated in FIG. 1B. The belt 204 rides on a pair of idler pulleys 206 and 208 which are rotatably secured to the machine frame and it also encircles a pulley 210 which is concentric with the pivotal axis of the arms 130 of the equatorial cutting blade 126. FIG. 7 shows the pulley 210 keyed to the shaft 132 which, in turn, carries the sprocket 136 which rotates the equatorial cutting blade 126 in the manner previously described.

Figure 15:
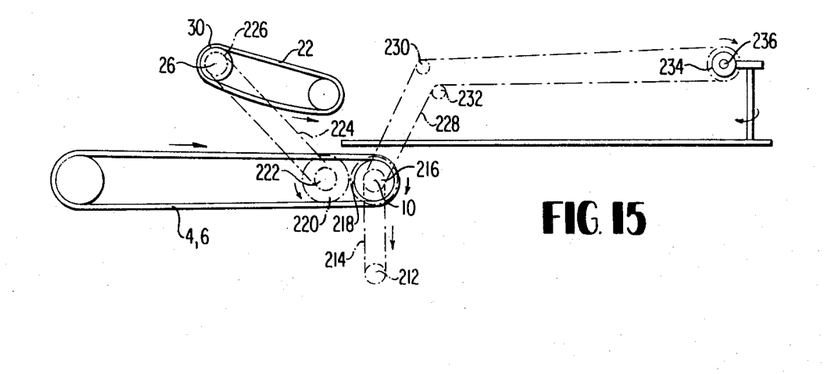
FIG. 15 is a diagrammatic view of the various elements in the drive train to the first and second conveyors.

A single drive motor is used for the two principal conveyors of the apparatus. This drive motor is concealed at the base of the machine frame and carries a drive sprocket 212 which is illustrated diagrammatically in FIG. 15. A chain 214 transmits the rotation of the sprocket 212 to a sprocket 216 which is keyed to the drive shaft 10 of the first conveyor.

The holddown portion of the first conveyor is driven by a gear 218 on the shaft 10 through a reversing gear 220. The gears 218 and 220 are of equal diameter so that they rotate at equal rotational velocities but in opposite directions. The shaft of the gear 220 also carries a sprocket 222 which engages the chain 224. The shaft 26 of the holddown conveyor has both a sprocket 226 which receives the drive chain 224 and the previously discussed sprocket 30 which carries the chain of the holddown assembly. The relative diameters of the sprockets are selected so that the linear velocity of the chain 22 of the holddown section is equal to the linear velocity of the chains 4 and 6 of the onion-supporting section of the first conveyor.

The second conveyor is driven from a sprocket keyed to the shaft 10, a chain 228 which rides over idler sprockets 230 and 232, and a driven sprocket 234 which rotates a shaft 236 supported by bearings on the machine frame.

Figure 13:
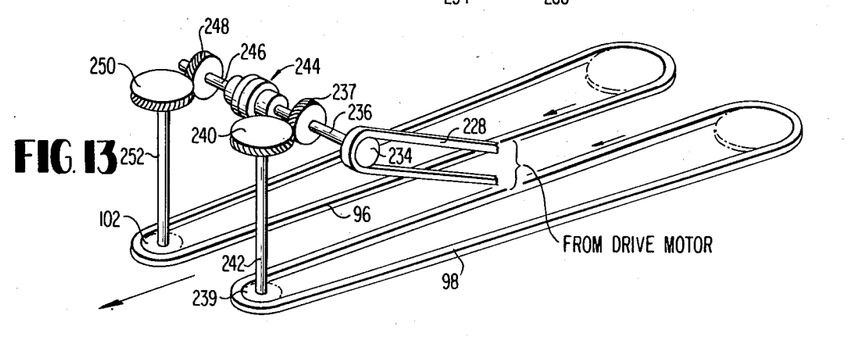
FIG. 13 is a diagrammatic view of the drive train leading to the elements of the second conveyor.

FIG. 13 illustrates the manner in which the sprocket 234 and shaft 236 drive the second conveyor. One of the chains 98 is driven by the shaft 236 through a worm gear 237 which rotates a gear 240 connected to a vertical shaft 242. The drive train to the chain 98 is completed by the shaft 242 and its attached sprocket 239.

An adjustable coupling 244 connects the shaft 236 to the drive shaft 246 for the conveyor chain 96. This drive train is completed through the worm gear 248, gear 250, shaft 252 and, finally, the drive sprocket 102 for the chain 96.

The purpose of the coupling 244 is to permit slight adjustments in the relative positioning of the onion engaging members 106 and 116 of the second conveyor. As illustrated in FIG. 14, the coupling 244 comprises a pair of circular flange elements 254 and 256 which are held together by a plurality of bolts 258, only one of which is shown. The bolts pass through arcuate elongated slots 260 in the flange 254 and are received by threaded apertures 262 in the flange 256. It will be apparent that the adjustments are performed simply by loosening the bolts 258 and relatively rotating the flanges 254 and 256 in order to bring the onion-engaging elements 106 and 116 into the desired opposed positions where they will accurately engage the opposite cut ends of an onion.

Those skilled in the art of designing food-processing machinery will realize that the features in the preferred embodiment of the invention may be adapted to many diverse types of equipment for processing onions and onion-like vegetables. Obviously, the sequence of cutting steps prior to the skin-removal operation may be rearranged, the end cutting step may be performed differently as by removing the crown and root ends by a coring operation, or the longitudinal cutting step may be eliminated. The conveyor systems may be modified since there are many ways of engaging and holding vegetables while performing operation such as those disclosed hereinabove. Since a great number of modifications to the disclosed apparatus fall within the spirit of this invention and since the disclosed method may be performed manually, it is to be understood that the scope and spirit of the invention is not limited to the single embodiment disclosed hereinabove, but is to be judged from the terms and by the spirit of the claims which follow.

We claim:

1. In a machine for removing skins from onions or like vegetables,
    conveyor means for moving vegetable in a path
    means for making a cut in the skin of a vegetable on the conveyor means,
    a nozzle for directing a fluid stream against a vegetable on the conveyor means,
    means for rotating a vegetable about its axis while it is subjected to the stream from the nozzle, and
    support means for supporting the nozzle in the path of a vegetable on the conveyor means, said support means lying in the path of vegetables on the conveyor and being movable under the influence of a vegetable advancing thereagainst in order to gauge the distance between the nozzle and the vegetable.

2. Apparatus for removing skin from onions or like vegetables, comprising,
    a first conveyor for advancing the vegetables in a first path which lies perpendicular to their polar axes,
    a pair of cutting discs spaced apart a given constant distance and being located in the first path of vegetables on the first conveyor to sever the crown and root ends thereof,
    a second conveyor for advancing the vegetable in a second path which lies perpendicular to their polar axes, said second conveyor having cooperating vegetable-engaging means movable toward each other to a vegetable-engaging position where they are aligned with vegetables on the first conveyor and are spaced apart a distance substantially equal to said given constant distance.

3. Apparatus according to claim 2 wherein the vegetable-engaging means are rotatable about an axis which lies perpendicular to the second path.

4. Apparatus according to claim 3 having means for positively rotating the vegetable-engaging means about said axis.

5. Apparatus according to claim 4 wherein the vegetable-engaging means has a pinion gear rotatable therewith and the means for positively rotating the vegetable-engaging means is a stationary rack engaged by the pinion gear.

* * * * *